June 28, 1960
A. J. HUCK ET AL
2,942,541
INSTANT COFFEE MAKER WITH THERMOSTATICALLY
CONTROLLED HOPPER THEREFOR
Original Filed Nov. 5, 1953
3 Sheets-Sheet 1
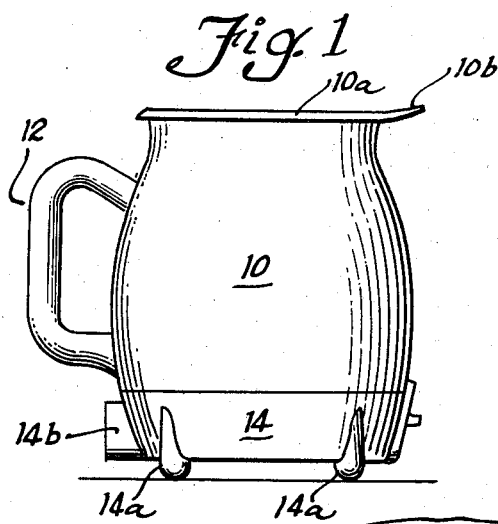
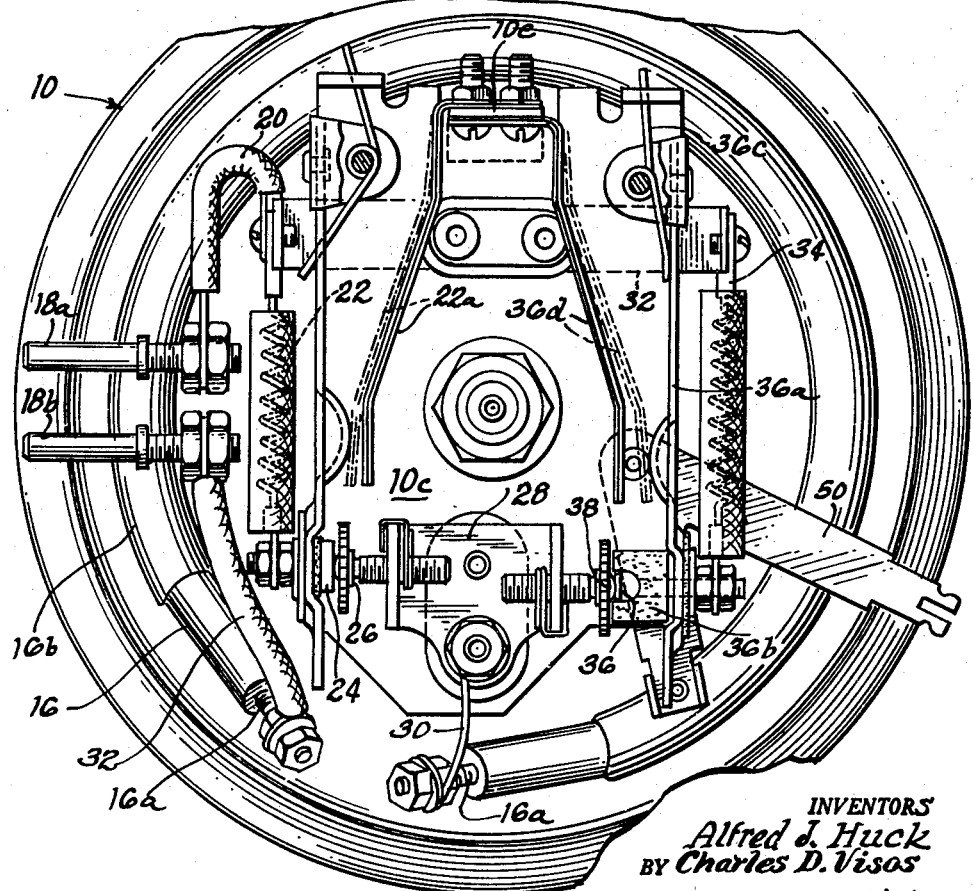
INVENTORS
Alfred J. Huck
BY Charles D. Visos
Bair, Freeman & Molinare
Att'ys

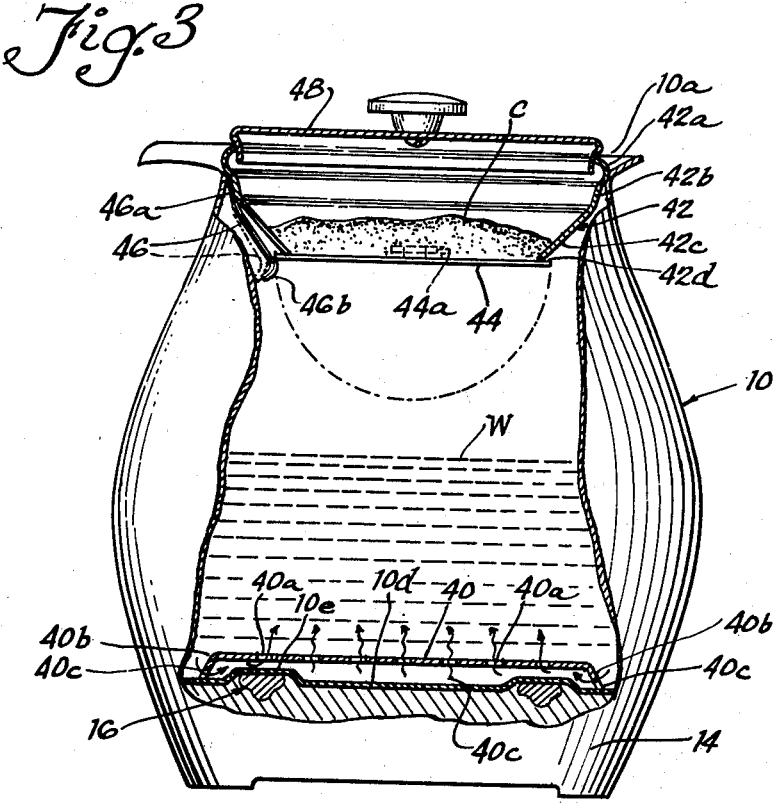
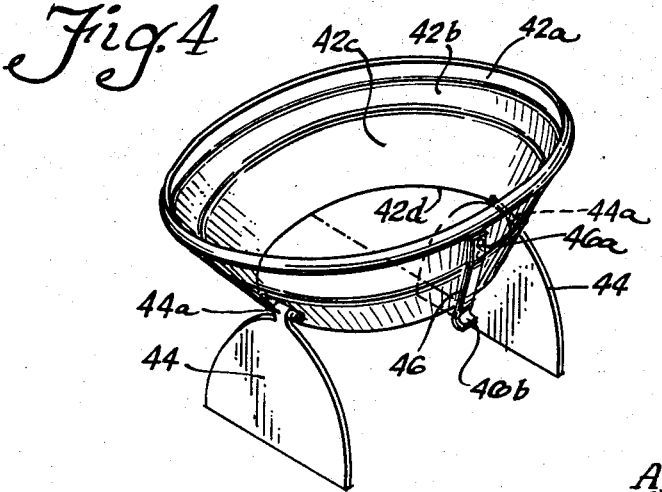

INVENTORS
Alfred J. Huck
BY Charles D. Visos
Bair, Freeman & Molinare
Att'ys

United States Patent Office 2,942,541
Patented June 28, 1960

2,942,541
INSTANT COFFEE MAKER WITH THERMOSTATICALLY CONTROLLED HOPPER THEREFOR

Alfred J. Huck and Charles D. Visos, St. Louis, Mo., assignors to Knapp-Monarch Company, St. Louis, Mo., a corporation of Missouri Original application Nov. 5, 1953, Ser. No. 390,342, now Patent No. 2,898,842, dated Aug. 11, 1959. Divided and this application Feb. 2, 1959, Ser. No. 790,637

3 Claims. (Cl. 99—275)

The present invention relates to an improved automatic coffee maker for instant-type coffee and more particularly to a thermostatically controlled coffee hopper therefor. This application is a division of a co-pending application, Serial No. 390,342, filed November 5, 1953, and now issued as Patent No. 2,898,842, issued August 11, 1959.

In the apparatus described herein a bowl is provided to receive water for the coffee brew. The instant-type coffee is placed in a hopper which forms a cover for the bowl and has a releasable bottom which discharges the coffee powder into the water at the proper time in the brewing cycle. The bottom of the bowl is heated by a suitable electric heating element which coacts with stirring means to assure agitation of the water in the bowl as the coffee-discharging temperature is reached. Thus, the instant coffee is discharged into agitated water of correct temperature for brewing. In accordance with the constructions shown herein, this agitation may be achieved by thermal effects in the water itself or, in the alternative, by the use of mechanical stirring elements actuated by the thermal circulation of the water or by other means. The coffee powder is discharged from the hopper into the heated water by thermostatic latch elements which release the coffee when heated by the steam rising from the boiling water. These elements are located for exposure to such steam, thus assuring a positive release of coffee powder at the moment the water reaches correct coffee powder-receiving temperature.

The heating of the bowl is controlled by a brewing thermostatic switch which de-energizes the heating element when water-boiling temperature has been reached. This switch snaps to the off position and stays off while the coffee is kept warm. A suitable on-off, keep-warm thermostatic switch recurrently energizes the heater to maintain the brew in palatable warm condition independently of the water-boiling switch.

It is, therefore, a general object of the present invention to provide an improved automatic coffee maker for instant type coffee.

A further object of the present invention is to provide an improved automatic coffee maker for instant-type coffee in which the coffee powder is discharged into the heated water positively and automatically when the water reaches correct coffee-receiving temperature.

Another object of the present invention is to provide an improved coffee maker for instant-type coffee in which heating of the water for the coffee gives rise to agitation that assures a prompt and effective admixture of the coffee powder and the water and the incident effective formation of a homogeneous brew without lumps of aggregated coffee powder.

The novel features which we believe to be characteristic of our invention are set forth with particularity in the appended claims. Our invention itself, however, both as to its organization and as to further objects and advantages thereof, may best be understood by reference to the following description taken in connection with the accompanying drawings, in which:

Figure 1 is a side elevational view of a coffee maker constructed in accordance with the present invention;

Figure 2 is a greatly enlarged view of the coffee maker from the bottom with parts broken away to show the construction of the switch elements;

Figure 3 is an enlarged view of the coffee maker from the side but with the shell broken away to show the interior thereof;

Figure 4 is a view in perspective of the hopper mechanism which releases the instant coffee at the correct moment;

Figure 5:
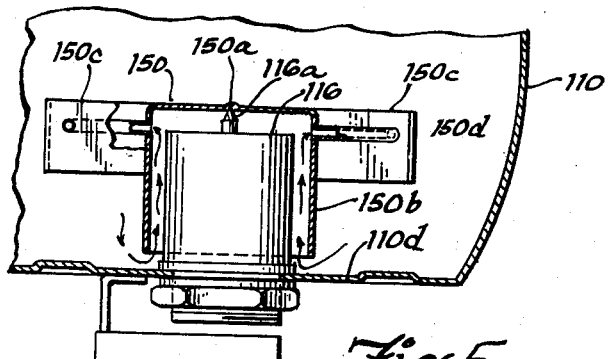
Figure 5 is an enlarged fragmentary axial cross-sectional view of an alternative form of the coffee maker.

Referring now to the structure of Figures 1–4, the coffee maker consists of a metal bowl 10 having a handle 12 and a suitable plastic insulating base 14. The top of the bowl has a lip 10a with a pouring spout 10b. The base has a series of supporting feet 14a and a socket 14b which is there in order to receive an appliance plug.

As shown in Figure 2, the relatively flat bottom 10c of the bowl 10 has an annular electric heating element 16 brazed or otherwise affixed in heat conducting relation to it. This heating element includes a resistance wire 16a imbedded in a suitable electrically insulating sleeve 16b.

The heater wire 16a is energized from the appliance cord receiving prongs 18a and 18b through either of two circuits. One circuit—the keep-warm circuit—extends from prong 18a through conductors 20 and 22 to the movable contact 24. The latter engages fixed contact 26 to complete the circuit to the insulated contact support 28 and wire 30 to the heater 16a. The circuit is completed through heater 16a to the wire 32 and the prong 18b. The other circuit—the brew control circuit—shunts the switch contacts 24—26 by the circuit which can be traced from wire 20 through conducting cross member 32 to the wire 34. This wire extends to the movable contact 36, which engages fixed contact 38 to establish a circuit to the conducting contact support plate 28. Thus the heater 16a is energized whenever either switch 24—26 or switch 36—38 is closed.

As is described in detail in the application of Alfred J. Huck and Charles D. Visos, Serial No. 341,248, filed March 9, 1953, entitled Lower Bowl Construction for Vacuum Type Coffee Makers and Switch Therefor, assigned to the same assignee as the present invention, and issued as Patent No. 2,667,566, dated January 26, 1954, the arm 36a carrying contact 36 is so supported and biased that the contact 36, once opened, remains in that condition even after the entire unit falls to room temperature. The wide dead band action is accomplished by the use of the magnet 36b which tends to hold the contacts 36—38 closed when they are in the closed condition and by the spring 36c which tends to open the contacts 36—38 in opposition to the magnet force and—with the contacts partially opened—overcomes the magnet force to hold them in the opened condition. The switch 24—26 opens and closes over a relatively small temperature range and thus acts as a temperature regulating switch.

As shown in Figure 3, the heater 16 is affixed to an annular raised embossment 10e in the bottom 10d of the bowl 10. This can be accomplished by welding, brazing, or similar means. The apertured flat cover 40 with openings 40a is received over the bottom 10d and extends over the embossment 10e and the area enclosed thereby. Cover 40 has a marginal skirt 40b which supports the plate and defines marginal holes 40c, as shown.

A hopper unit shown generally at 42 is received on the lip portion 10a of the bowl 10, as shown in Figure 3. This hopper has a rounded lip-receiving rim 40a which rests in annular contact on the lip 10a. A cylindrical portion 42b and a conical portion 42c depend from this lip-receiving portion, as shown, to form a circular bottom rim 42d, Figures 3 and 4. Instant-type coffee C is supported in the hopper 42 by a pair of latch-supported trap doors 44. These are of semi-circular conformation to close the bottom of the hopper when in the up position of Figure 3. They are swingably supported from diametrically opposed points by the hinges 44a, Figure 4, so as to swing to the opened vertical position of Figure 4 when released. The doors 44 are releasably held in the up position of Figure 3 by the bimetal latch 46, Figures 3 and 4. This latch is held in place on the cylindrical portion 42b of the hopper 42 by the rivet 46a. It extends downwardly and terminates in a rounded door-engaging part 46b.

At normal room temperature the bimetal 46 extends to the door-engaging and supporting position of Figure 3. In this position it sustains the doors in closed position and holds the coffee C above the water W in the bowl, as shown in Figure 3. When the temperature of the bimetal 46 rises, as hereafter described, the bimetal flexes outwardly toward the dotted line position of Figure 3. In this position it moves free of the doors 44 and permits them to fall to the coffee-releasing position of Figure 4.

It will be noted that the bimetal 46 is exposed to steam arising from the water W as the same is heated by the element 16.

A cover 48 is removably carried by the hopper 42 to protect the coffee therein against contamination. This is particularly desirable where—as in clock-controlled operation—the coffee maker must remain in condition to make coffee for a long period of time prior to being energized.

*Practical operation*

The mechanism of Figures 1–4 operates as follows. With coffee C and water W in the bowl 10, the user moves control arm 50, Figure 2, to the coffee-making position shown in that figure. This closes contacts 36—38 so that the heater 16 is energized when power is applied to appliance prongs 18a and 18b.

When current is applied to prongs 18a and 18b by insertion of an appliance plug, the heater 16 is energized and the water W is heated. As the water temperature rises and bubbles of steam being to be produced, the water violently agitates. This is due to the concentrated local heating at the heater 16, which recurrently causes steam formation which drives the water out openings 40a, Figure 3. Water then rushes in through the openings 40c and in a short time steam formation again occurs to drive the water through the openings 40a. This recurrent action imparts violent motion to the water and causes it to agitate as the boiling temperature is approached.

As the heating of the water W continues, the bimetals 22a and 36d, Figure 2, are heated by reason of the fact that they are conductively connected to the bottom of the bowl 10 by the lug 10e. These bimetals flex to the dotted line positions where they open their respective contacts 24–26 and 36–38 at preset temperatures. The bimetal 22a opens contacts 24–26 at the desired keep-warm temperature, say 180° F. Bimetal 36d opens contacts 36–38 at a temperature just below water-boiling temperature.

The actual water temperature in the bowl 10 is somewhat above boiling temperatures when contacts 36–38 actually open. This is due to the thermal capacity of the bimetal 36d and the post 10e, together with the delay associated with the fact that these parts do not have perfect thermal conductance. Because of these effects the water W reaches a boiling state and steam condenses on the bimetal 46 before the switch 36–38 snaps to off position. Also, after the switch goes off, there is some continued production of steam. In addition, the bimetal 46 is heated by radiation and convection from the heated water W. All these factors combine to cause a sufficient heating of the bimetal 46 to flex the same to the dotted line position of Figure 3. When this occurs, the doors 44 are released and the coffee C is dumped into the agitating water W.

Preferably, the bimetal 44 is designed to release the coffee C an instant before boiling of the water W ceases. In other words, the bimetal 46 is set to release at a temperature well below water-boiling temperature so that it flexes to the door-releasing condition, even though only a small amount of steam has actually been produced and a period of time must elapse before switch 36–38 opens. The coffee C is thus deposited in the violently agitating heated water and forms a brew without lumps.

Thereafter, the keep-warm switch 24–26 is recurrently opened and closed by bimetal 22a to maintain the brew at the desired serving temperature.

The operation of the keep-warm feature of the structure shown in Figure 2 is described in detail in the application of Alfred J. Huck and Charles D. Visos, above identified.

Figure 6:
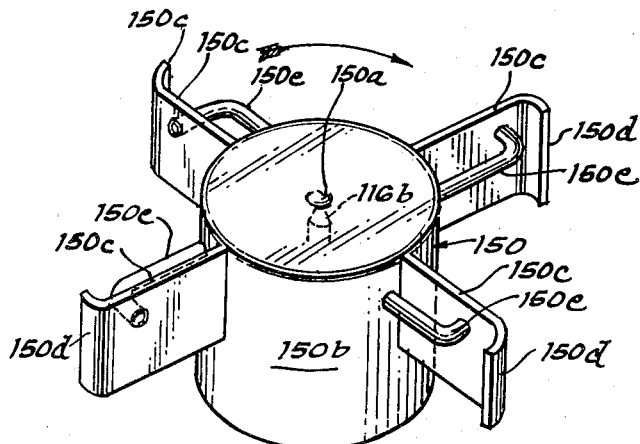
Figure 6 is a view in perspective of the rotor portion of the coffee maker of Figure 5.

Figures 5 and 6 show a modified form of the present invention. In this structure parts corresponding to those of Figures 1–4 are identified with the number 100 added. In the unit of Figures 5 and 6 the heater 116 is a percolator type heater protruding from the bottom 110d of the bowl 110. This heater is energized by control elements (not shown) in the same manner as the heater 16, Figure 3. A pointed bearing 116a extends above the heater 116 and receives the bearing-dimple 150a of the rotor 150 which has a depending cylindrical skirt portion 150b which embraces the heater 116.

The rotor 150 has a series of four vanes 150c, which extend radially outwardly and terminate in circumferential ears 150d. A pipe 150e extends from the rotor 150 adjacent its top to each vane 150c and through the vane to discharge on the opposite side thereof.

In operation, the heater 116 produces a thermal circulation of the water inwardly into the region between the heater 116 and the rotor 150, upwardly in the annular space between these parts, outwardly through the pipes 150e, and into the main body of water. The circulation is augmented by the intermittent production of steam by reason of percolator action.

The thermostatic control elements to energize and shut off the heater 116, Figures 5 and 6, can be of the type shown and described above in connection with Figures 1 and 2. The instant coffee storage and releasing mechanism may be like that shown in Figures 3 and 4, described above.

Figure 8:
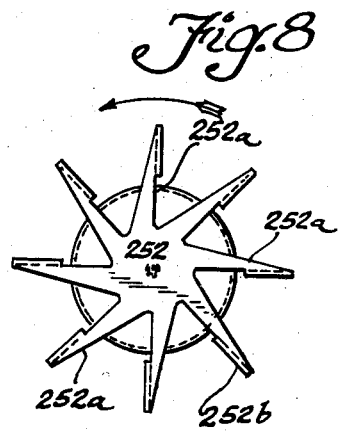
Figures 8 and 9 are cross-sectional views through the indicated cross sections of Figure 7, Figure 9 being to a somewhat enlarged scale.
Figure 7:
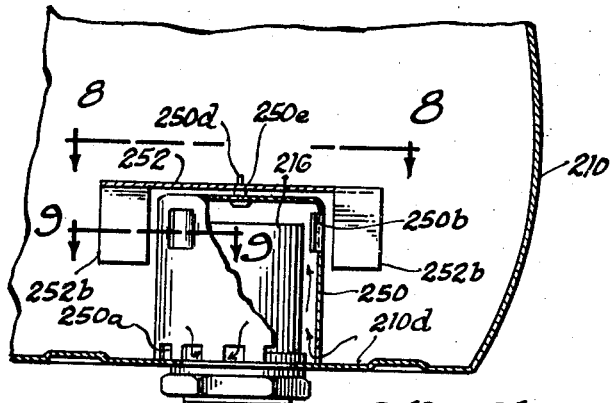
Figure 7 is a view like Figure 5 of another form of the present invention.
Figure 9:
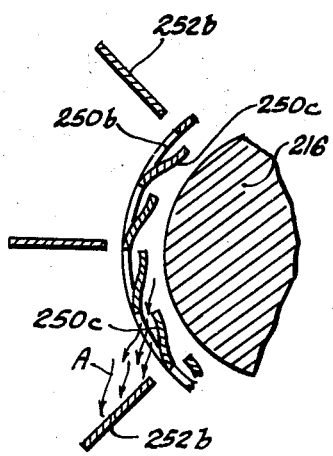

Figures 7, 8 and 9 show still another embodiment of the present invention. In these figures, parts corresponding with those of Figures 1–4 are indicated with like reference numerals with 200 added.

As shown in Figures 7–9, the heater 216 of this embodiment is of the percolator type protruding from the bottom 210d of the bowl 210. A fixed housing 250 closely surrounds the heater 216 and has bottom fluid inlet openings 250a and top water outlet openings 250b. The latter openings are formed by the ears 250c, which are depressed radially inwardly so as to direct escaping fluid in the circumferential direction, as indicated by the arrows A, Figure 9.

The roof of the housing 250 carries the centrally disposed vertical pin 250d, which has an annular shoulder 250e. A rotor 252 is received on the pin and rests against the annular shoulder. This rotor has a plurality of radial arms 252a which, at their outer ends, extend downwardly to form vanes 252b.

When the heater 216 is energized, and particularly as the water approaches the boiling condition, liquid is driven through the openings 250b with a substantial circumferential component of motion. The liquid thus impinges on the vanes 252b to rotate the same and thereby produce additional agitation beyond that associated with the thermal flow itself.

The energizing mechanism for the heater 216 may be like that shown in Figures 1 and 2, and the instant coffee storing and discharging mechanism may be like that shown in Figures 3 and 4.

It will be noted that in all the forms of the apparatus described above, means is provided to heat the water W, Figure 3, and simultaneously agitate the water. As the water reaches boiling temperature, the agitation is particularly intense and at that time the contents of the hopper 42, Figure 4, are discharged into the heated water. Thereafter, the heater is de-energized and remains de-energized except for the recurrent heating to keep the brew warm.

In addition to its application in brewing instant coffee, the apparatus of the present invention can be used to brew tea.

While we have shown and described specific embodiments of the present invention, it will be understood that various modifications and alternative constructions may be made without departing from the true spirit and scope of the invention. We, therefore, intend by the appended claims to cover all such modifications and alternative constructions as fall within their true spirit and scope.

What we claim as new and desire to secure by Letters Patent of the United States is:

1. A thermostatically controlled, instant-coffee hopper, for use in a coffee brewing device of the type comprising a water containing bowl having a bottom, upright sides and an open top with a support rim therearound, and a coffee hopper positioned in register with the open top of the bowl and spaced above the water contained in said bowl; said thermostatically controlled hopper comprising, in combination: upright hopper side wall means including an outwardly extending rim means adapted to engage the support rim on said bowl to removably support the hopper in said bowl in spaced relation above the water in the bowl and with the remainder of the hopper spaced from the sides of said bowl; hopper bottom means hingedly supported on the hopper side wall means and movable to open and closed hopper positions, said bottom means being adapted to support instant coffee powder in said hopper when said bottom means is in the closed position and to afford discharge of the instant coffee from said hopper into the water in said bowl when said bottom means is in said open position; and a bimetal latch member cooperating between said hopper side wall means and said bottom means to normally maintain said bottom means in closed position and being exposed to respond at a predetermined temperature to heated vapor generated from the water in said bowl to permit said bottom means to open to discharge the instant coffee powder from the hopper into the heated water in said bowl.

2. A thermostatically controlled, instant-coffee hopper, for use in a coffee brewing device of the type comprising a water containing bowl having a bottom, upright sides and an open top with a support rim therearound, and a coffee hopper positioned in register with the open top of the bowl and spaced above the water contained in said bowl; said thermostatically controlled hopper comprising, in combination: upright hopper side wall means including an outwardly extending rim means adapted to engage the support rim on said bowl to removably support the hopper in said bowl in spaced relation above the water in the bowl and with the remainder of the hopper spaced from the sides of said bowl; hopper bottom means hingedly supported on the hopper side wall means and movable to open and closed hopper positions, said bottom means being adapted to support instant coffee powder in said hopper when said bottom means is in the closed position and to afford discharge of the instant coffee from said hopper into the water in said bowl when said bottom means is in said open position; and an elongated bimetal latch member carried on the outside of side wall means and normally positioned to engage said bottom means to maintain said bottom in closed position, said bimetal adapted to move away from engagement with said bottom means with increase in temperature of said bimetal in response to heated vapor from water in the bowl, to permit the bottom means to move by gravity to open position to discharge the instant coffee powder from the hopper into the heated water in said bowl.

3. A thermostatically controlled, instant-coffee hopper, for use in a coffee brewing device of the type comprising a water containing bowl having a bottom, upright sides and an open top with a support rim therearound, and a coffee hopper positioned in register with the open top of the bowl and spaced above the water contained in said bowl; said thermostatically controlled hopper comprising, in combination: upright hopper side wall means including an outwardly extending rim means adapted to engage the support rim on said bowl to removably support the hopper in said bowl in spaced relation above the water in the bowl and with the remainder of the hopper spaced from the sides of said bowl; hopper bottom means including a plurality of complementary bottom segments hingedly supported on the hopper side wall means and movable to open and closed hopper positions, said bottom means being adapted to support instant coffee powder in said hopper when said bottom means is in the closed position and to afford discharge of the instant coffee from said hopper into the water in said bowl when said bottom means is in said open position; and an elongated bimetal latch member carried on the outside of side wall means and normally positioned to engage a portion of each of said bottom segments of said bottom means to maintain said bottom in closed position, said bimetal adapted to move away from engagement with said bottom means with increase in temperature of said bimetal in response to heated vapor from water in the bowl, to permit the bottom means to move by gravity to open position to discharge the instant coffee powder from the hopper into the heated water in said bowl.

References Cited in the file of this patent

UNITED STATES PATENTS

| | | |
|---|---|---|
| 2,566,914 | Worst | Sept. 4, 1951 |

FOREIGN PATENTS

| | | |
|---|---|---|
| 550,000 | Germany | May 7, 1932 |
| 454,824 | Great Britain | Oct. 8, 1936 |
| 835,025 | Germany | Mar. 27, 1952 |